United States Patent [19]
Kishi et al.

[11] Patent Number: 5,155,685
[45] Date of Patent: Oct. 13, 1992

[54] SEAT WITH FATIGUE LESSENING DEVICE

[75] Inventors: Yoichi Kishi, Yokosuka; Hideyuki Nagashima, Yokohama; Akira Mochizuki, Kanagawa, all of Japan

[73] Assignee: Nissan Motor Co., Ltd., Yokohama, Japan

[21] Appl. No.: 551,386

[22] Filed: Jul. 12, 1990

[30] Foreign Application Priority Data

Jul. 14, 1989 [JP] Japan .................................. 1-180513

[51] Int. Cl.5 .............................................. G06F 15/20
[52] U.S. Cl. .............................. 364/424.05; 296/65.1; 318/467
[58] Field of Search ...................... 364/424.05, 424.01; 318/466, 467; 296/65.1

[56] References Cited

U.S. PATENT DOCUMENTS

| 4,706,194 | 11/1987 | Webb et al. | 364/424.05 |
| 4,797,824 | 1/1989 | Sugiyama et al. | 364/424.05 |
| 4,811,226 | 3/1989 | Shinohara | 364/424.05 |
| 4,812,838 | 3/1989 | Tashiro et al. | 340/825.06 |
| 4,833,614 | 5/1989 | Saitoh et al. | 364/424.05 |
| 4,853,687 | 8/1989 | Isomura et al. | 340/825.3 |

Primary Examiner—Thomas G. Black
Attorney, Agent, or Firm—Pennie & Edmonds

[57] ABSTRACT

A seat having fatigue lessening device has a seat shape changer for changing an occupant holding portion of the seat. A physique judging device is employed for determining whether the occupant is overweight, middle sized or slim. The operation of the seat shape changer is controlled in accordance with information provided by the physique judging device.

32 Claims, 5 Drawing Sheets

SEAT WITH FATIGUE LESSENING DEVICE

BACKGROUND OF THE INVENTION

1. Field of the Invention

The present invention relates in general to seats for motor vehicles and more particularly to seats of a shape-adjustable type which can change the shape of the seat to adjust to the physique of a seat occupant. More specifically, the present invention is concerned with the shape-adjustable seats of a type in which the shape change of the seat is achieved by controlling air pressure in various air-bags installed in the seat.

2. Description of the Prior Art

Hitherto, various shape-adjustable seats have been proposed and put into practical use particularly in the field of motor vehicles.

One of them is shown in Japanese Utility Model First Provisional Publication No. 59-195029. The seat of this publication uses a plurality of electric motors which, with an aid of a microcomputer, moves given portions of the seat. That is, when in use, an information on the height of the seat user is inputted to the computer. By processing the information, the computer controls the operation of the electric motors to provide the seat with a shape suitable for comfortably holding the occupant. The shape of the seat thus automatically but roughly provided can be accurately adjusted thereafter by operating a manual switch In this case, the accurately adjusted shape is memorized, and thus, thereafter, the accurately adjusted shape is automatically provided by the seat when the occupant uses the seat inputting his or her height information to the computer.

Another seat of the shape adjustable type is shown in Japanese Patent First Provisional Publication No. 61-257333. The seat of this publication employs a plurality of air-bags which are installed in given portions of the seat. By changing the air-pressure in each air-bag, the shape of the seat is changed. During a long time driving, a timer means operates to vary the air-pressure in the air-bags at regular intervals. With this, the pressure applied to given portions of the seat occupant by the air-bags is changed at regular intervals thereby lessening the fatigue of the seat occupant.

However, in the above-mentioned two conventional seats, the degree of fatigue of a seat occupant relative to his or her physique is given little thought. In fact, the physique of the seat occupant has a close relationship to the degree of fatigue as will be understood from the graphs of FIGS. 6 and 7.

That is, as is seen from FIG. 6, the degree of fatigue of the lumbar portion is higher in a slim person than in a overweight person. As seen from FIG. 7, the degree of the hip portion is higher in the overweight than in the slender person. This means that there is a positive correlation between the fatigue of an occupant and his or her physique.

SUMMARY OF THE INVENTION

It is therefore an object of the present invention to provide a shape adjustable seat in which the above-mentioned correlation between the fatigue of an occupant and his or her physique is embodied.

According to the present invention, there is provided a shape adjustable seat which can change the shape of given portions of the seat at intervals determined in accordance with the physique of an occupant.

According to the present invention, there is provided a seat which comprises first means for changing the shape of the seat occupant holding portion of the seat; second means for controlling the first means at given intervals; this means for determining the physique of a person sitting on the seat; and fourth means for determining the given intervals in accordance with an information given by the third means.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
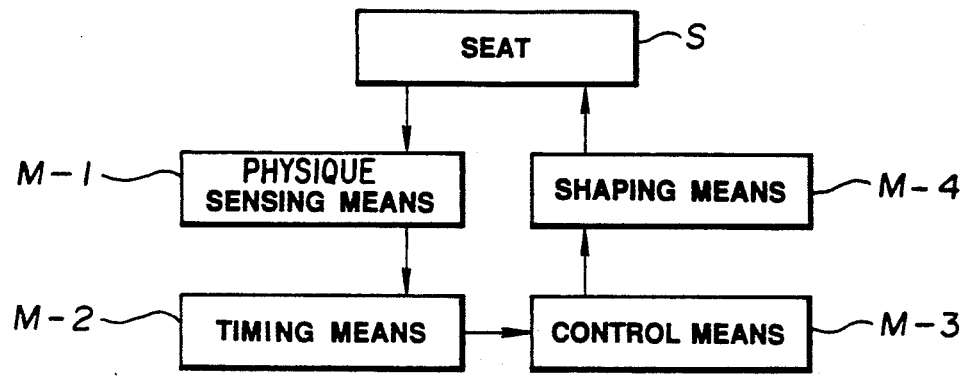
FIG. 1 is a block diagram depicting the present invention.

Referring to FIG. 1, there is shown a block diagram of the present invention, which generally includes a physique sensing means "M-1", a timing means "M-2", a control means "M-3" and a shaping means "M-4" which are incorporated with a seat proper "S" in a manner described below.

Figure 2:
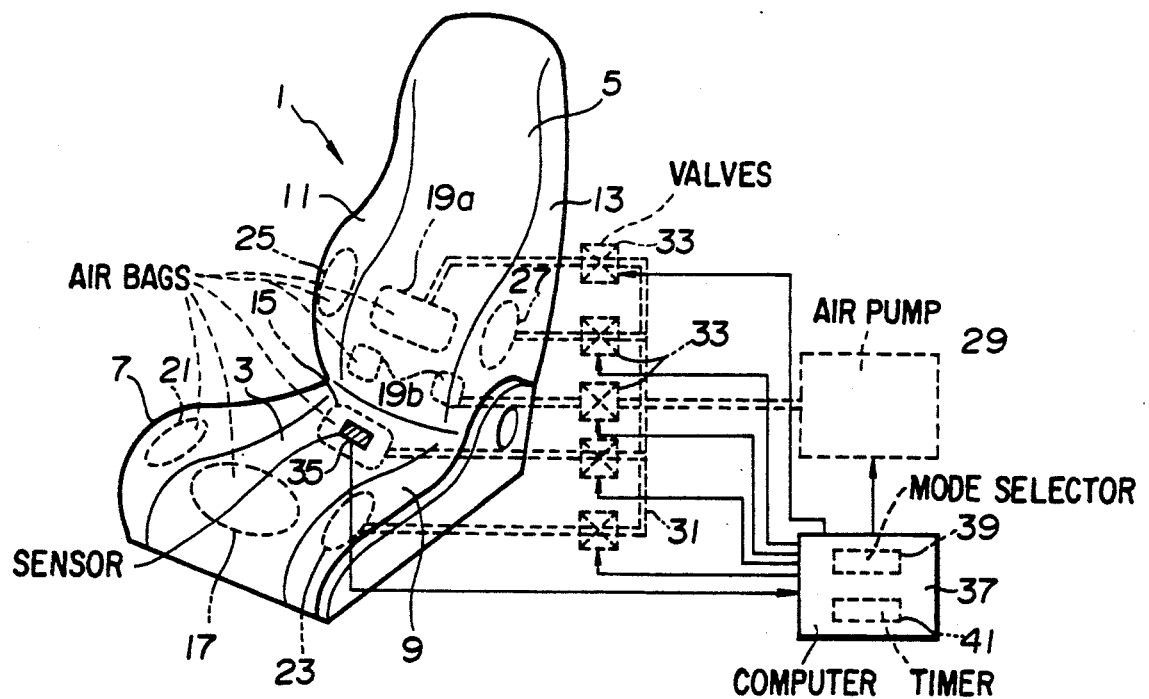
FIG. 2 is a perspective view of a shape adjustable seat which is a first embodiment of the present invention.

Referring to FIG. 2, there is shown a first embodiment of the present invention, which is an automotive seat 1.

The seat 1 comprises a seat cushion 3 and a seatback 5. The seat cushion 3 has side support portions 7 and 9 mounted to both sides thereof, and the seatback 5 has side support portions 11 and 13 mounted to both sides thereof.

Within the seat cushion 3, there are installed a hip supporting air-bag 15 and a thigh support air-bag 17 which are arranged to support respectively the hip and thigh portions of a person who sits on the seat 1.

Within the seatback 5, there are installed lumbar supporting air-bags 19a and 19b which are arranged to support the lumbar of the occupant.

Within the side support portions 7 and 9 of the seat cushion 3, there are installed respective side supporting air-bags 21 and 23 which are arranged to support side portions of the thighs of the occupant.

Within the side support portions 11 and 13 of the seatback 5, there are installed respective side supporting air-bags 25 and 27 which are arranged to support sides of an upper half of the seat occupant.

All of the air-bags 15 to 27 are connected through branch pipes to an outlet pipe 31 which extends from an electric air pump 29. It is to be noted that the air-bags 21 and 23 are communicated through a pipe (not shown) and the air-bags 25 and 27 are communicated through another pipe (not shown). The branch pipes have electromagnetic valves 33 respectively mounted thereto, which are controlled by a control unit including a microcomputer 37. Thus, the air-bags 15 to 27, the air pump 29 and the valves 33 constitute the shaping means "M-4" for shaping the seat occupant holding portion of the seat 1.

Thus, by controlling the valves 33 with an aid of the computer 37, the amount of pressurized air fed to the air-bags 15 to 27 is varied to provide the seat occupant holding portion of the seat 1 with a desired shape for the seat occupant.

Within the seat 1, there is further installed the physique sensing means "M-1" which senses the physique of the occupant. The sensing means "M-1" used in this embodiment is a pressure sensor 35, such as a strain gauge or the like. Information signals from this pressure sensor 35 is fed to the control unit which is the control means "M-3".

In the disclosed embodiment, the pressure sensor 35 is installed in the seat cushion 3 at a portion where the hip portion of a seat occupant is to be positioned. By sensing the pressure applied thereto by the occupant, the pressure sensor 35 determined, with the aid of the computer 37, that he or she is slim, overweight or middlesized.

The control unit has the timing means "M-2" which determines the timing for carrying out thee seat shape changing in accordance with the physique of the occupant detected by the pressure sensor 35.

The timing means "M-2" comprises a mode determining section 39 and a timer 41. When a time predetermined in a given mode passes, the timing means "M-2" issues control signals to both the air pump 29 and some of the valves 33 in a manner as will be understood from the following.

Figure 3:
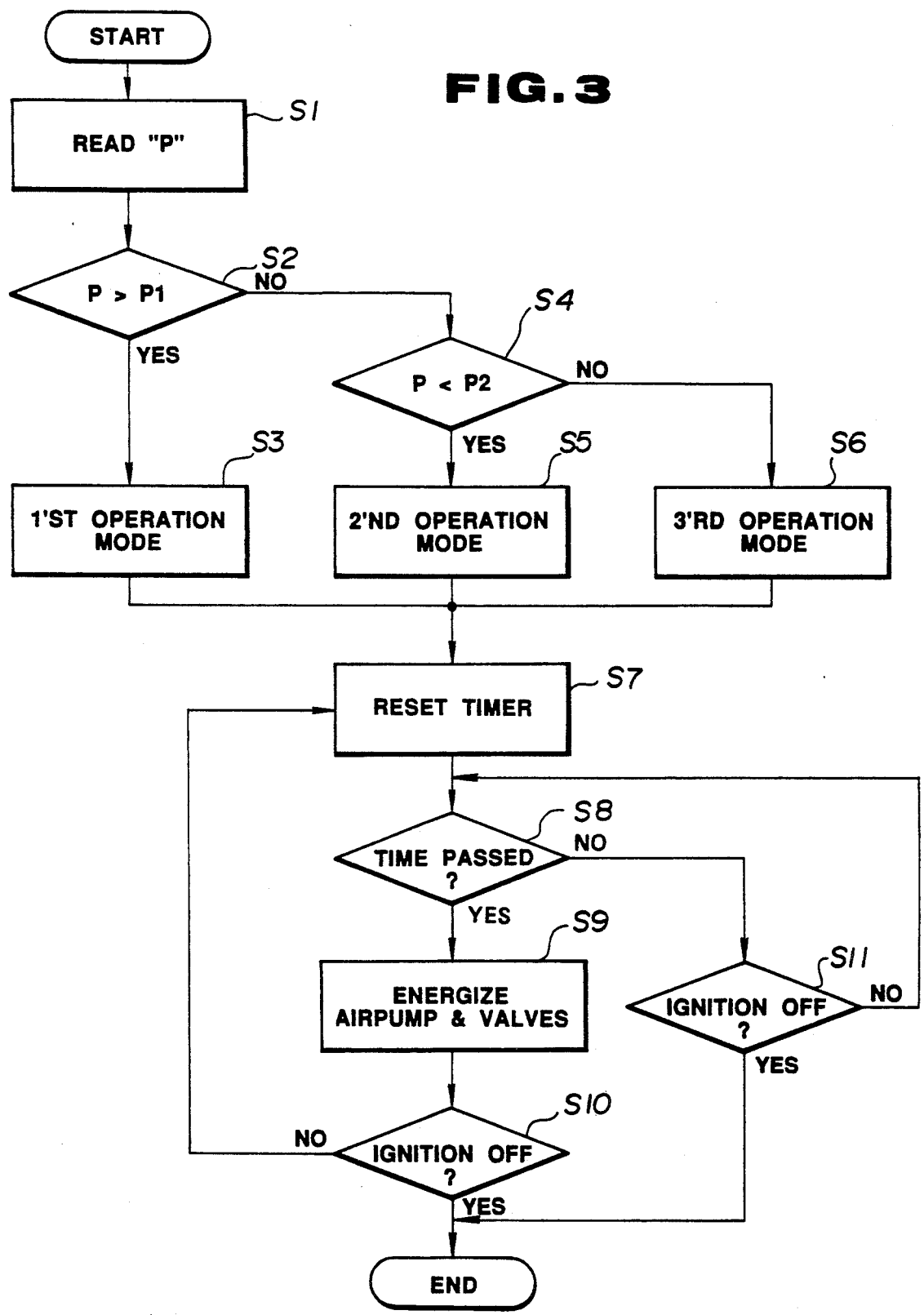
FIG. 3 is a flowchart which shows the operation steps to be carried out by a computer employed in the first embodiment.

In the following, operation of the first embodiment will be described with reference to the flowchart of FIG. 3.

When a person (for example, a driver) sitting on the seat turns an ignition switch ON, the program starts and at step S1, the pressure "P" applied to the pressure sensor 35 by the seat occupant is read. Then, at step S2, a judgement is carried out whether the pressure "P" is greater than a first predetermined value "P1" or not. If Yes, the occupant is considered overweight and the operation goes to step S3 wherein a first predetermined operation mode for a overweight person has been programmed. If No, the operation step goes to step S4 wherein a judgement is carried out whether the pressure "P" is smaller than a second predetermined value "P2". If Yes, the occupant is considered slim and the operation step goes to step S5 wherein a second predetermined operation mode for a slim person has been programmed. If No at step S4, the seat occupant is considered middle-sized and, the operation step goes to step S6 wherein a third predetermined operation mode for a middle-sized person has been programmed.

These first, second and third operation modes are each provided by the mode determining section 39 of the timing means "M-2" and the interval time is set by the timer 41.

The setting of the interval time of each operation mode is made as follows.

Figure 6:
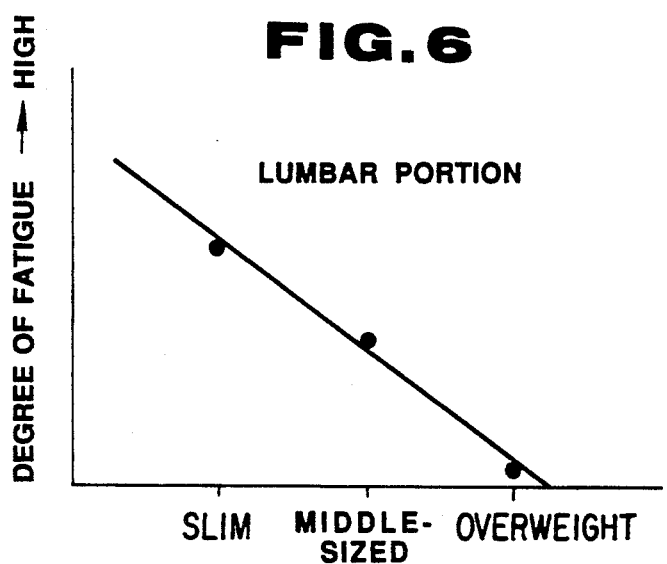
FIG. 6 is a graph showing a relationship between the constitution of a seat occupant and the degree of fatigue of the lumbar portion.
Figure 7:
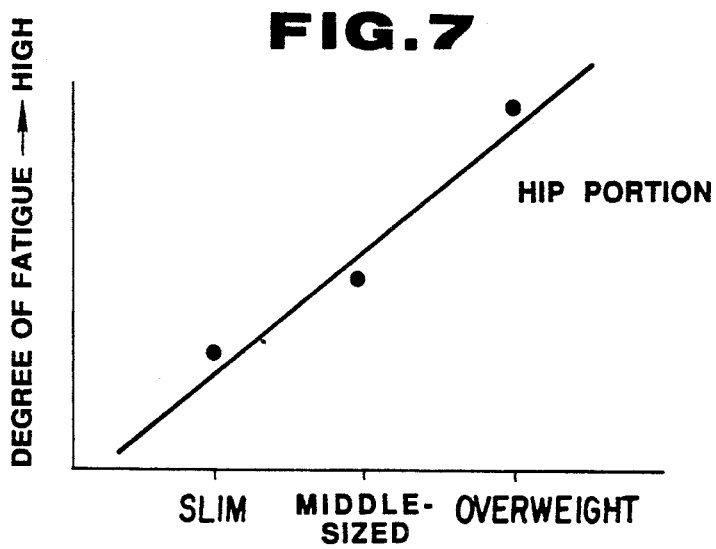
FIG. 7 is a graph showing a relationship between the physique of the seat occupant and the degree of fatigue of the hip portion.

That is, as is seen from the graphs of FIGS. 6 and 7, the overweight person has such a tendency for the degree of fatigue of the lumbar portion to be relatively low and the degree of fatigue of the hip portion to be relatively high. Thus, in the first operation mode, the operation interval of the lumbar supporting air-bags 19a and 19b is set relatively long, while, the operation interval of the hip supporting air-bag 15 is set relatively short. In the second operation mode for the slim person, the operation interval of the lumbar supporting air-bags 19a and 19b is set relatively short, while, the operation interval of the hip supporting air-bag 15 is set relatively long. In the third operation mode for the middlesized person, the operation intervals of the air-bags 19a, 19b and 15 are set at middle values.

When one operation mode S3, S5 or S6 is selected, the operation step goes to step S7 and the timer 41 of the timing means "M-2" is reset. Then, the operation goes to step S8 wherein a judgement is carried out as to whether the time determined by the timer 41 elapses. If Yes, that is, when the predetermined time has elapsed, the operation step goes to step S9. At this step, the air pump 29 is energized and the valve 33 for the hip supporting air-bag 15 or the valves 33 for the lumbar supporting air-bags 19a and 19b are controlled to frequently open and close the corresponding branch pipes. With this, the hip supporting air-bag 15 or the lumbar supporting air-bags 19a and 19b are forced to repeat the expansion-contraction for a given time. Thus, the hip portion or the lumbar portion of the occupant is massaged (more specifically, pressed several times) for the given time lessening the fatigue of the portion.

. It is thus to be noted that if the first operation mode (which is for a overweight person) is selected, the massaging of the hip portion is carried out at shorter intervals as compared with that of the lumbar portion, while, if the second operation mode (which is for a slim person) is selected, the massaging of the lumbar portion is carried out at shorter intervals as compared with that of the hip portion.

The operation step then goes to step S10 to judge whether the ignition switch is OFF. If No, that is, when the engine is still operating, the operation returns back to step S7 to reset the timer 41 again for continuation of the control. If Yes, that is, when the engine has stopped, the control is stopped.

If No at step S8, that is, when the time measured by the timer 41 does not fulfill the predetermined value, the operation goes to step S11 to judge whether the ignition switch is OFF. If Yes, that is, when the engine has stopped, the control is stopped. If No, that is, the engine is still operating, the operation step goes back to step S8 to continue the operation.

Besides the above-mentioned massaging method, the following method is also available.

That is, one cycle including air-charging and air-discharging is carried out within a predetermined time. In this method, a considerable pressure is applied to the hip or lumbar portion of the seat occupant at given intervals. If desired, motor powered press members and vibrators may be used as the massaging means.

Figure 4:
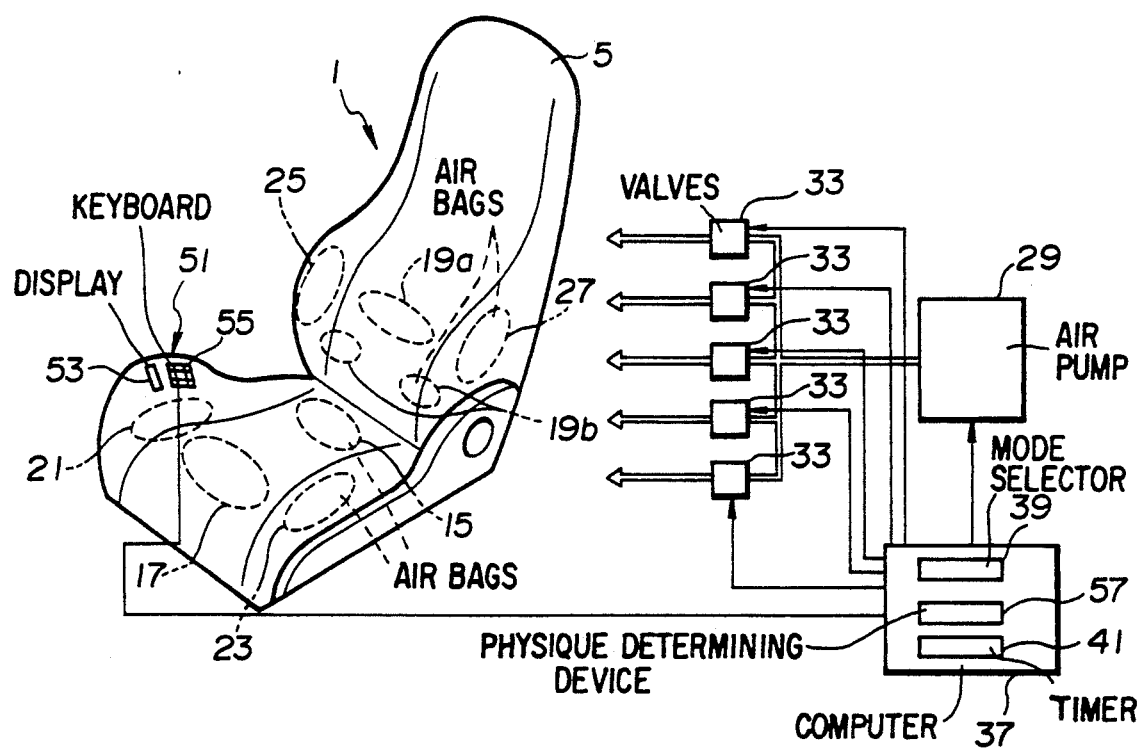
FIG. 4 is a view similar to FIG. 2, but showing a second embodiment of the present invention.
Figure 5:
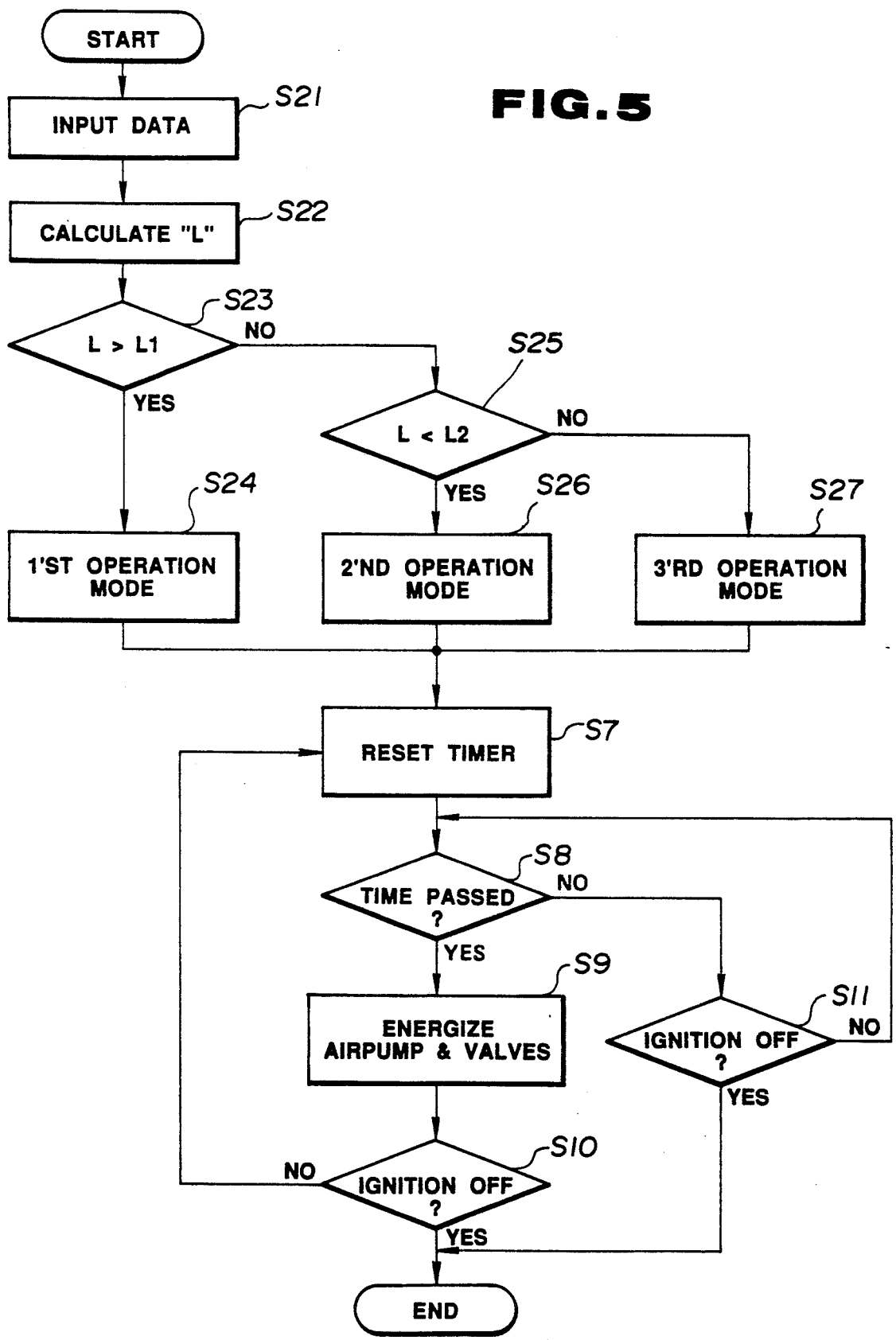
FIG. 5 is a flowchart which shows the operation steps to be carried out by a computer employed in the second embodiment.

Referring to FIGS. 4, 5 and 6, there is shown a second embodiment of the present invention.

In this embodiment, more precise control is achieved. That is, the control of the seat is carried out by using various factors of the physique of an occupant. As will become apparent hereinafter, in this embodiment, the occupant inputs several informations (for example, occupant's height, weight and the like) to the control unit by using input keys 55.

FIG. 4 shows a seat 1 of the second embodiment, whose construction is basically the same as that of the above-mentioned first embodiment. However, in the second embodiment, an information input unit 51 and a physique judging means 57 are further employed. The information input unit 51 includes a display device 53 and a key board 55.

In the following, operation of the second embodiment will be described with reference to the flowchart shown in FIG. 5.

When a person (for exampler, a driver) sitting on the seat 1 turns an ignition switch ON, the program starts and he or she manipulates the key board 55 to input the informations representing his or her physique (viz., height, weight and the like). At step S21, the informations are read. At step S22, the informations are quantified to provide an obesity indix "L". Then, at step S23, a judgement is carried out as to whether the obesity indix "L" is greater than a first predetermined value "L1". If Yes, that is, when the occupant is relatively overweight, the operation step goes to step S24 wherein a first predetermined operation mode for a relatively overweight person has been programmed. If No, the operation step goes to step S25 to judge whether the obesity indix "L" is smaller than a second predetermined value "L2". If Yes, that is, when the occupant is relatively slim, the operation step goes to step S26 wherein a second predetermined operation mode for a relatively slim person has been programmed. If No, that is, when the occupant is middle-sized, the operation step goes to step S27 wherein a third predetermined operation mode for a middle-sized person has been programmed.

When one operation mode S24, S26 or S27 is selected, the operation step goes to step S7 which is the same as the step S7 employed in the above-mentioned first embodiment. Thereafter, the operation step goes through the steps S8, S9, S10 and S11 (see FIG. 3) in the same manner as has been described in the afore-mentioned first embodiment.

Although, in the above-mentioned two embodiments, only the hip supporting air-bag 15 and the lumbar supporting air-bags 19a and 19b are designed to effect the massaging operation, the other air-bags 21, 23, 25 and 27 may be designed to effect such massaging operation.

Figure 8:
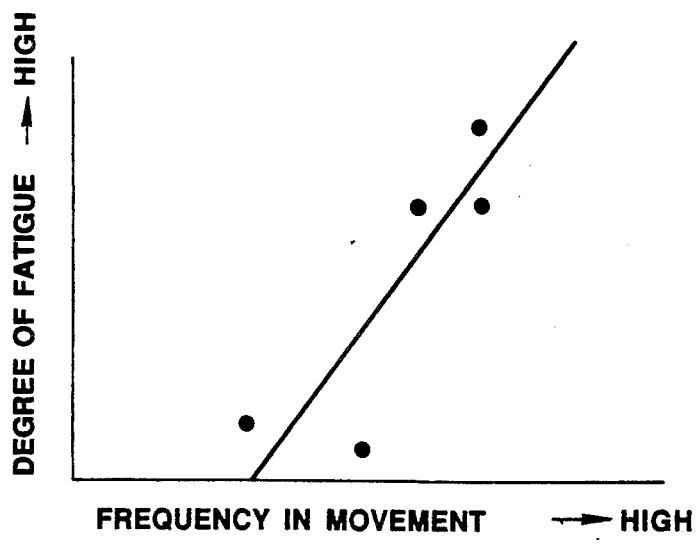
FIG. 8 is a graph showing a relationship between a frequency in movement of a given portion of the seat occupant and the degree of fatigue of the given portion.

If desired, the controlling of the air-bags 15, 19a and 19b may be carried out by directly sensing the degree of fatigue of a seat occupant. That is, as is understood from the graph of FIG. 8, between the degree of fatigue and the frequency in movement of the seat occupant, there is a positive correlation. Thus, by measuring the frequency in movement of the seat occupant, the degree of fatigue can be sensed.

In addition to the above, Flicker value, Oculogyration, Electromyogram, Blood pressure and Skin temperature of the seat occupant are usable as factors for detecting the degree of fatigue.

What is claimed is:

1. A seat control system comprising:
a seat with an occupant holding portion;
first means for changing the shape of said occupant holding portion;
second means for controlling said first means to change the shape of said occupant holding portion for a given duration at given intervals;
third means for producing an information representative of the physique of an occupant; and
fourth means for changing said given intervals in accordance with said information from said third means.

2. A seat control system as claimed in claim 1, wherein said first means comprises:
an air pump;
a plurality of air-bags installed in given portions of the seat;
a plurality of pipes connecting the respective air-bags to an outlet of said air-pump; and
electromagnetic valves mounted to the respective pipes to selectively open and close the same.

3. A seat control system as claimed in claim 2, wherein said second and fourth means are incorporated with a computer.

4. A seat control system as claimed in claim 3, wherein said third means comprises a pressure sensor which is installed in a seat cushion of the seat at the position where the hip portion of the occupant is placed.

5. A seat control system as claimed in claim 4, wherein said third means further comprises means for determining whether the occupant is overweight, middle-sized or slim in accordance with a pressure applied to said pressure sensor by the occupant.

6. A seat control system as claimed in claim 5, wherein said fourth means comprises a timer which starts a time measuring when said third means has determined the physique of the occupant.

7. A seat control system as claimed in claim 6, wherein the time measured by said timer is determined in accordance with the physique of the occupant determined by said third means.

8. A seat control system as claimed in claim 3, wherein said third means comprises a key board through which various factors of the physique of the occupant are fed to said computer.

9. A seat control system as claimed in claim 8, wherein said factors include height and weight of the occupant.

10. A seat control system as claimed in claim 9, wherein said third means includes means which quantifies the inputted factors to an obesity index of the occupant.

11. A seat control system as claimed in claim 10, wherein said third means quantifies the occupant as overweight, middle-sized or slim in accordance with the obesity index of the occupant.

12. A seat control system as claimed in claim 11, wherein said fourth means comprises a timer which starts a time measuring when said third means has determined the physique of the occupant.

13. A seat control system as claimed in claim 12, wherein the time measured by said timer is determined in accordance with the physique of the occupant determined by said third means.

14. A seat control system as claimed in claim 1, wherein the changing of said intervals by said physique of the occupant is carried out in an analogue manner.

15. A seat control system as claimed in claim 1, wherein said first means comprises an air-bag which is installed in a seatback of the seat at a position which supports a lumbar portion of the occupant.

16. A seat control system as claimed in claim 1, wherein said third means determines the physique of the occupant by information based on weight, figure, and height of the occupant.

17. A seat control system as claimed in claim 16, wherein the given intervals are controlled by the information of the third means which represents the weight, figure and height of the occupant.

18. A seat control system comprising:
a seat with an occupant holding portion;
first means for changing the shape of a first given part of said occupant holding portion for a given duration at a first given interval;
second means for changing the shape of a second given part of said seat occupant holding portion for a given duration at a second given interval;
third means for providing an information signal representative of the physique of an occupant; and
fourth means for changing said first and second given intervals in accordance with said information signal from said third means.

19. A seat control system as claimed in claim 18, wherein said first and second means comprises:
an air pump;
a plurality of air-bags installed in the seat, wherein two of the air-bags are installed in said first and second given parts of said occupant holding portion;
a plurality of pipes connecting the respective air-bags to an outlet of said air-pump; and
electromagnetic valves mounted to the respective pipes to selectively open and close the same.

20. A seat control system as claimed in claim 19, wherein said fourth means is incorporated with a computer.

21. A seat control system as claimed in claim 20, wherein said third means comprises a pressure sensor which is installed in a seat cushion of the seat at the position where the hip portion of the occupant is placed.

22. A seat control system as claimed in claim 21, wherein said third means further comprises means for determining whether the occupant is overweight, middle-sized or slim in accordance with pressure applied to said pressure sensor by the occupant.

23. A seat control system as claimed in claim 22, wherein said fourth means comprises a timer which starts a time measuring when said third means has determined the physique of the occupant.

24. A seat control system as claimed in claim 23, wherein the time measured by said timer is determined in accordance with the physique of the occupant determined by said third means.

25. A seat control system as claimed in claim 20, wherein said third means comprises a key board through which various factors of the physique of the occupant are manually fed to said computer.

26. A seat control system as claimed in claim 25, wherein said factors include height and weight of the occupant.

27. A seat control system as claimed in claim 26, wherein said third means includes means which quantifies the inputted factors to an obesity index of the occupant.

28. A seat control system as claimed in claim 27, wherein said third means quantifies the occupant as overweight, middle-sized or slim in accordance with the obesity index of the occupant.

29. A seat control system as claimed in claim 28, wherein said fourth means comprises a timer which starts a time measuring when said third means has determined the physique of the occupant.

30. A seat control system as claimed in claim 29, wherein the time measured by said timer is determined in accordance with the physique of the occupant determined by said third means.

31. A seat control system as claimed in claim 18, wherein said first given part is the part which supports a hip portion of the occupant and in which said fourth means shortens said second given interval when said third means provide an information signal which represents an overweight occupant.

32. A seat control system as claimed in claim 31, wherein said second given part is a part which supports a lumbar portion of the occupant and in which said fourth means shortens said second given interval when said third means provide and information signal which represents a slim occupant.

* * * * *